(12) United States Patent
Hori

(10) Patent No.: US 12,236,147 B2
(45) Date of Patent: Feb. 25, 2025

(54) SYSTEM AND TERMINAL APPARATUS

(71) Applicant: TOYOTA JIDOSHA KABUSHIKI KAISHA, Aichi-ken (JP)

(72) Inventor: Tatsuro Hori, Tokyo-to (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/337,047

(22) Filed: Jun. 19, 2023

(65) Prior Publication Data
US 2023/0409266 A1 Dec. 21, 2023

(30) Foreign Application Priority Data
Jun. 20, 2022 (JP) ................................. 2022-099119

(51) Int. Cl.
*G06T 7/50* (2017.01)
*G06F 3/14* (2006.01)
(Continued)

(52) U.S. Cl.
CPC .................. *G06F 3/14* (2013.01); *G06T 5/50* (2013.01); *G06T 7/50* (2017.01); *G06T 7/90* (2017.01);
(Continued)

(58) Field of Classification Search
CPC ..... G06F 3/14; G06T 5/50; G06T 7/50; G06T 7/90; G06T 2207/10024;
(Continued)

(56) References Cited

U.S. PATENT DOCUMENTS

2009/0161172 A1* 6/2009 Mizutani ............. H04N 1/4074
358/466
2010/0085420 A1 4/2010 Kato et al.
(Continued)

FOREIGN PATENT DOCUMENTS

JP 2001-312001 A 11/2001
JP 5213627 B2 6/2013
(Continued)

*Primary Examiner* — Temesghen Ghebretinsae
*Assistant Examiner* — K. Kiyabu
(74) *Attorney, Agent, or Firm* — HAUPTMAN HAM, LLP

(57) ABSTRACT

A system according to the present disclosure includes a first terminal apparatus that repeatedly transmits an image captured using an imager and a second terminal apparatus that displays the received captured image. The first terminal apparatus acquires a position of a display object capable of displaying information, determines, when existence of a blocking object between the display object and the imager is detected, whether a blocked portion, which is a portion where the display object is at least partially blocked by the blocking object, exists within the captured image, and processes, when the blocked portion exists within the captured image, the captured image for the blocked portion within the captured image to be identifiable and transmits a captured image in which the blocked portion is identifiable as the captured image. The second terminal apparatus displays the captured image without displaying the blocked portion based on the received captured image.

19 Claims, 8 Drawing Sheets

(51) Int. Cl.
*G06T 5/50* (2006.01)
*G06T 7/90* (2017.01)

(52) U.S. Cl.
CPC ............... *G06T 2207/10024* (2013.01); *G06T 2207/20221* (2013.01)

(58) Field of Classification Search
CPC .......... G06T 2207/20221; H04N 23/60; H04N 23/63; H04N 23/95
See application file for complete search history.

(56) References Cited

U.S. PATENT DOCUMENTS

| | | | |
|---|---|---|---|
| 2012/0062594 A1* | 3/2012 | Campbell | G06T 11/00 345/632 |
| 2014/0092281 A1* | 4/2014 | Nisenzon | H04N 13/271 348/262 |
| 2015/0373283 A1 | 12/2015 | Hayashi et al. | |
| 2017/0006260 A1* | 1/2017 | Fogarty | G06T 3/40 |
| 2021/0074044 A1* | 3/2021 | Jung | G09G 5/003 |
| 2022/0335620 A1* | 10/2022 | Ostap | G06T 5/008 |

FOREIGN PATENT DOCUMENTS

| | | |
|---|---|---|
| JP | 2016-009266 A | 1/2016 |
| JP | 2019-057328 A | 4/2019 |

\* cited by examiner

SYSTEM AND TERMINAL APPARATUS

CROSS-REFERENCE TO RELATED APPLICATION

This application claims priority to Japanese Patent Application No. 2022-099119, filed on Jun. 20, 2022, the entire contents of which are incorporated herein by reference.

TECHNICAL FIELD

The present disclosure relates to a system and a terminal apparatus.

BACKGROUND

Technology is known for a plurality of computers to communicate via a network and hold meetings on the network. In such network meetings, technology is known for capturing information, such as text or pictures drawn by a user on a display object such as paper or a whiteboard, with a camera and sharing the information. For example, Patent Literature (PTL) 1 discloses a projected image storage system that projects a manuscript onto a whiteboard using a projector, captures a composite image of the projected manuscript and the text and numbers written on the whiteboard with a marker, and stores, displays, and prints the composite image.

CITATION LIST

Patent Literature

PTL 1: JP 2001-312001 A

SUMMARY

However, there exists demand for further improvement in the usefulness of the technology for capturing information displayed on a display object, such as paper or a whiteboard, and sharing the information over a network. For example, when information written by a user on a display object is captured by a camera and shared in real time, the user's hand or head may act as a blocking object and end up hiding the information on the display object, resulting in incorrect sharing (occlusion).

It would be helpful to improve the usefulness of technology for capturing information displayed on a display object, such as paper or a whiteboard, and sharing the information via a network.

A system according to an embodiment of the present disclosure is a system including:
a first terminal apparatus configured to repeatedly transmit a captured image that is captured using an imager; and
a second terminal apparatus configured to display the captured image received from the first terminal apparatus, wherein
the first terminal apparatus is configured to
acquire a position of a display object capable of displaying information,
determine, in a case in which existence of a blocking object between the display object and the imager is detected, whether a blocked portion, which is a portion where the display object is at least partially blocked by the blocking object, exists within the captured image, and
process, in a case in which it is determined that the blocked portion exists within the captured image, the captured image for the blocked portion within the captured image to be identifiable and transmit a captured image in which the blocked portion is identifiable as the captured image, and
the second terminal apparatus is configured to display the captured image without displaying the blocked portion based on the captured image received from the first terminal apparatus.

A terminal apparatus according to an embodiment of the present disclosure is a terminal apparatus including an imager, a communication interface, and a controller and configured to repeatedly transmit a captured image that is captured using the imager, wherein
the controller is configured to
acquire a position of a display object capable of displaying information,
determine, in a case in which existence of a blocking object between the display object and the imager is detected, whether a blocked portion, which is a portion where the display object is at least partially blocked by the blocking object, exists within the captured image, and
process, in a case in which it is determined that the blocked portion exists within the captured image, the captured image for the blocked portion within the captured image to be identifiable and transmit a captured image in which the blocked portion is identifiable as the captured image.

A terminal apparatus according to an embodiment of the present disclosure is a terminal apparatus including an output interface, a communication interface, and a controller and configured to display a captured image received from another terminal apparatus, wherein
in a case in which the captured image received from the another terminal apparatus is a captured image in which a blocked portion existing within the captured image is identifiable, the controller is configured to display the captured image without displaying the blocked portion, and
the blocked portion is a portion in the captured image where a display object configured to display information is at least partially blocked by a blocking object.

According to an embodiment of the present disclosure, the usefulness of technology for capturing information displayed on a display object, such as paper or a whiteboard, and sharing the information over a network is improved.

DETAILED DESCRIPTION

Hereinafter, an embodiment of the present disclosure will be described.

(Outline of Embodiment)

Figure 1:
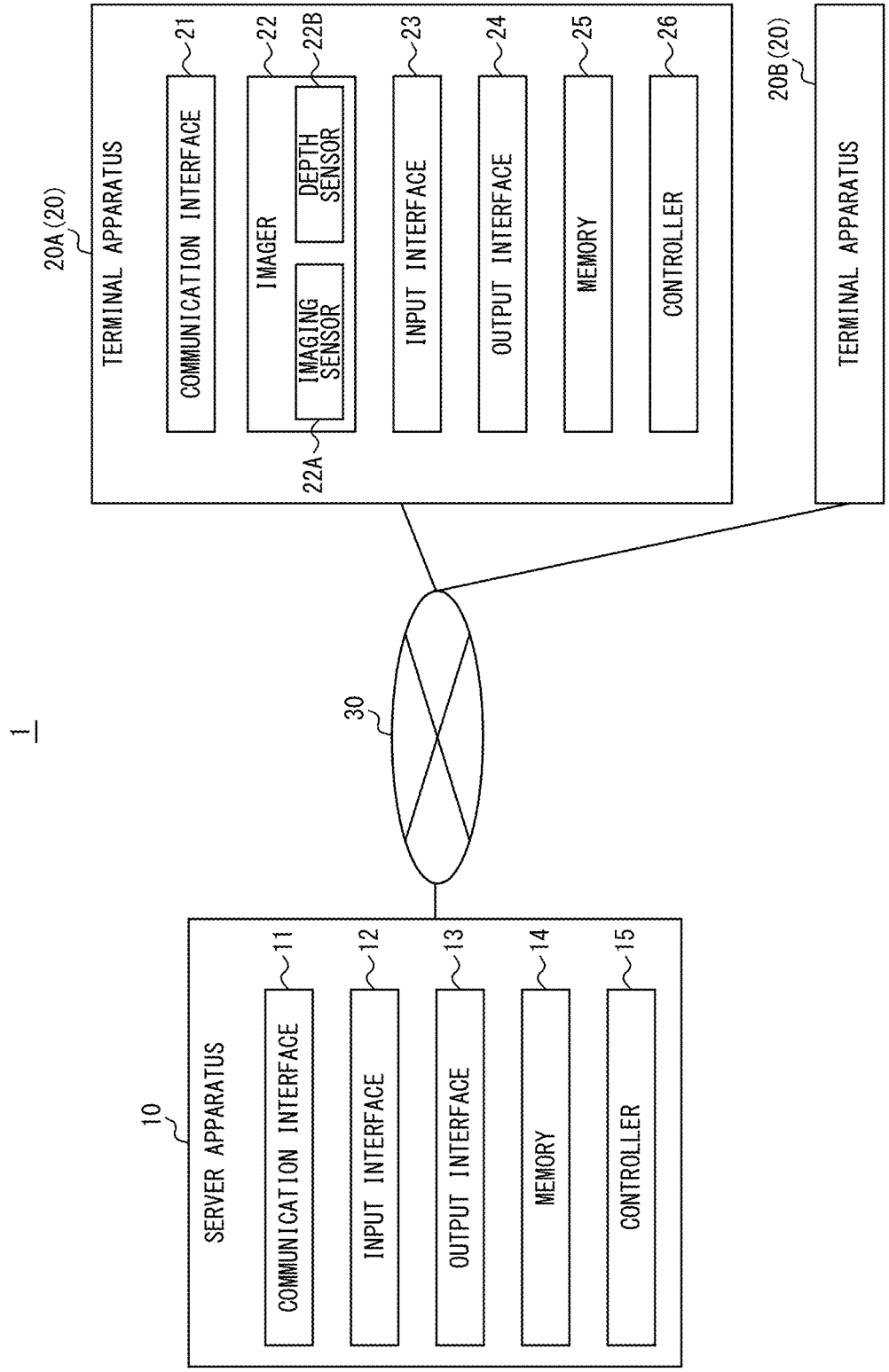
FIG. 1 is a block diagram illustrating a schematic configuration of a system according to an embodiment of the present disclosure.

An outline of a system 1 according to an embodiment of the present disclosure will be described with reference to FIG. 1. FIG. 1 is a block diagram illustrating a schematic configuration of the system 1. The system 1 includes a server apparatus 10, a first terminal apparatus 20A, and a second terminal apparatus 20B.

The server apparatus 10 is one computer or a plurality of computers that can communicate with each other. The first terminal apparatus 20A and second terminal apparatus 20B are, for example, personal computers but may be any computer, such as a smartphone or tablet device. In the present embodiment, the first terminal apparatus 20A and the second terminal apparatus 20B are configured identically. That is, the first terminal apparatus 20A can also operate as the second terminal apparatus 20B, and the second terminal apparatus can also operate as the first terminal apparatus 20A. Hereinafter, the first terminal apparatus 20A and the second terminal apparatus 20B are collectively referred to simply as the terminal apparatus 20 when no distinction therebetween is made. However, the first terminal apparatus 20A and the second terminal apparatus 20B may be configured differently from each other.

The server apparatus 10, the first terminal apparatus 20A, and the second terminal apparatus 20B are communicably connected to a network 30. The network 30 may, for example, be the Internet or may include an ad hoc network, a local area network (LAN), a metropolitan area network (MAN), other networks, or any combination thereof.

For the sake of simplicity, one server apparatus 10 and two terminal apparatuses 20 are illustrated in FIG. 1. However, the system 1 may include any number of server apparatuses 10 and terminal apparatuses 20.

Figure 2:
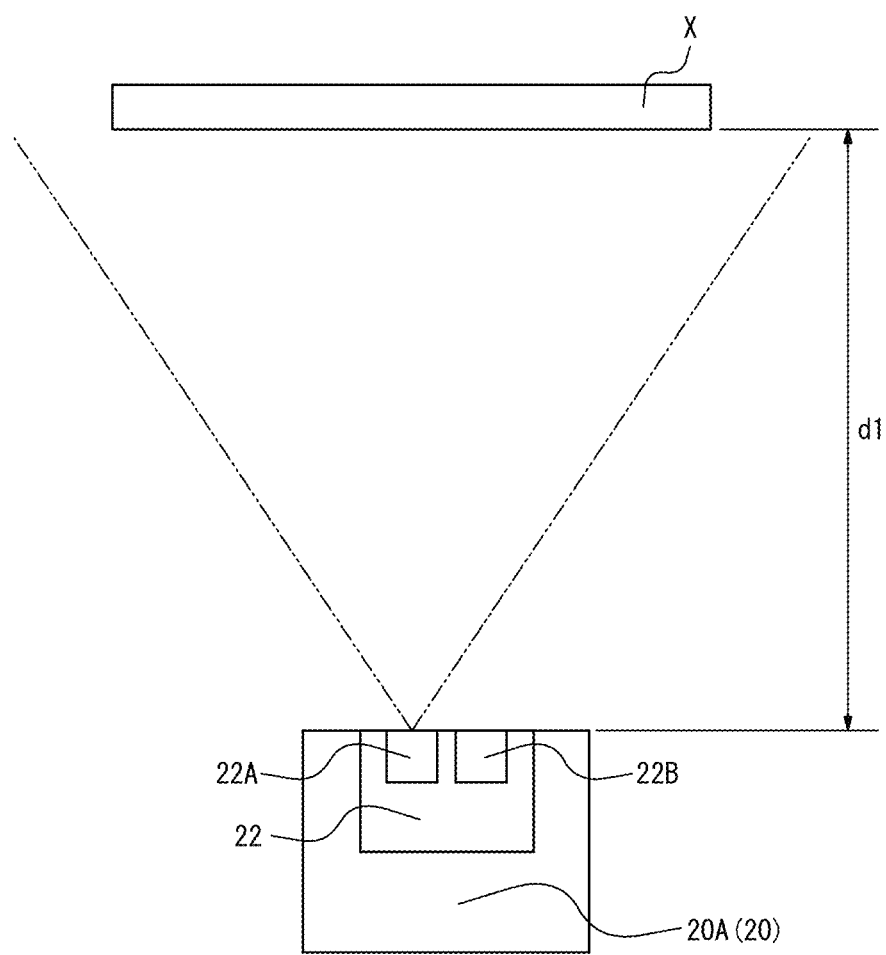
FIG. 2 is a diagram illustrating the positional relationship, from above, between a first terminal apparatus illustrated in FIG. 1 and a display object.
Figure 3:
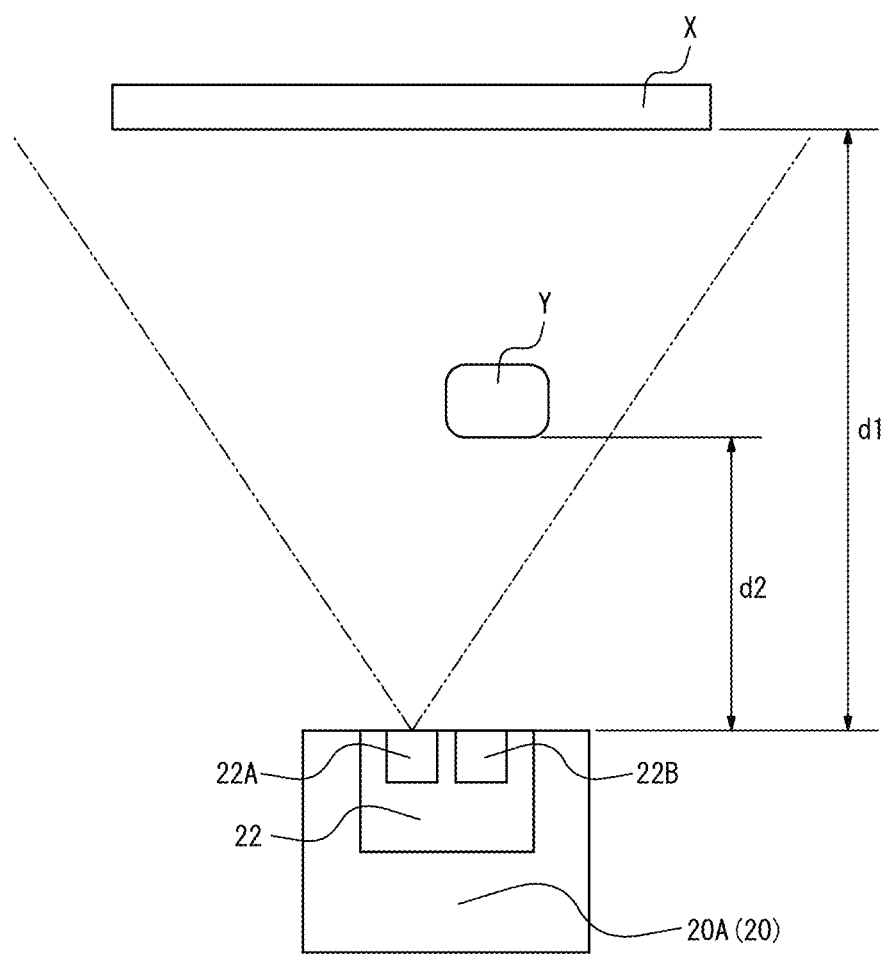
FIG. 3 is a diagram illustrating the positional relationship, from above, between the first terminal apparatus illustrated in FIG. 1, a display object, and a blocking object.
Figure 4:
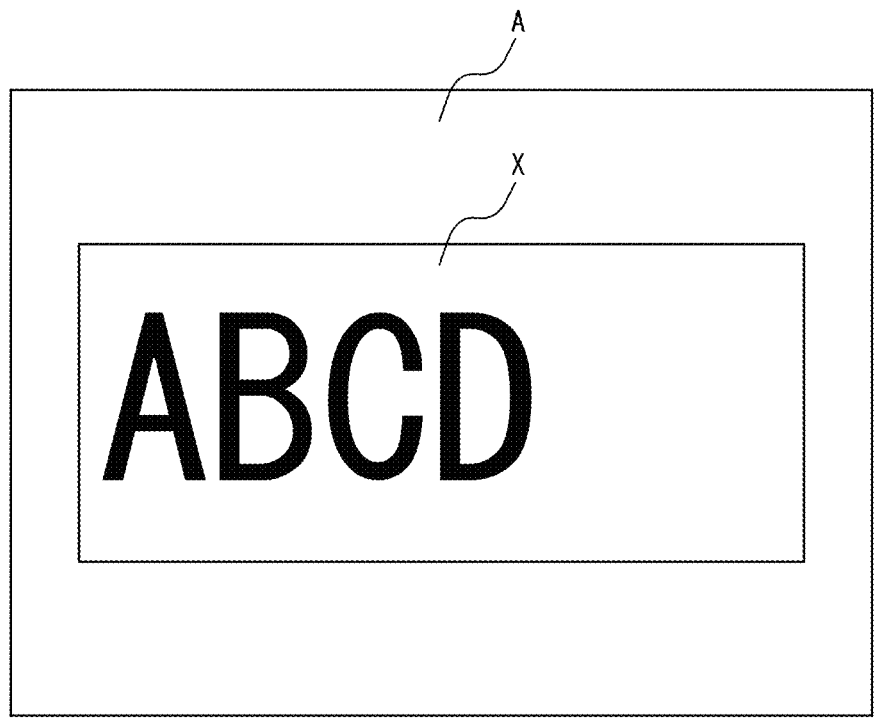
FIG. 4 is a diagram illustrating a captured image captured by the first terminal apparatus in the positional relationship illustrated in FIG. 2.
Figure 5:
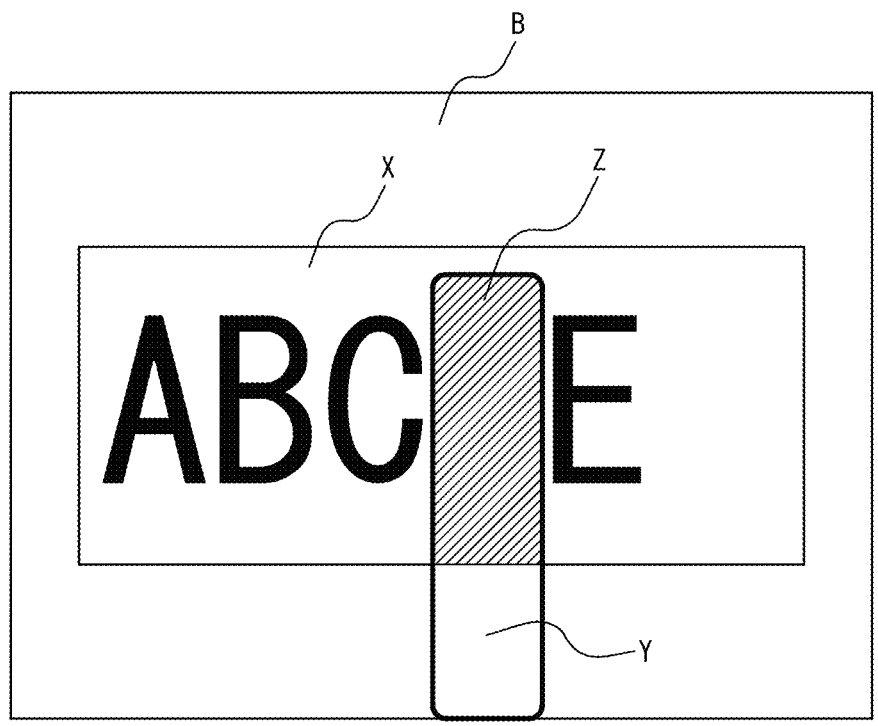
FIG. 5 is a diagram illustrating a captured image captured by the first terminal apparatus in the positional relationship illustrated in FIG. 3.

First, with reference to FIGS. 1, 2, 3, 4, and 5, an outline of the present embodiment will be described, and details thereof will be described later. FIG. 2 is a diagram illustrating the positional relationship, from above, between the first terminal apparatus 20A and a display object X. FIG. 3 is a diagram illustrating the positional relationship, from above, between the first terminal apparatus 20A, the display object X, and a blocking object Y. FIG. 4 is a diagram illustrating a captured image A captured by the first terminal apparatus 20A in the positional relationship illustrated in FIG. 2. FIG. 5 is a diagram illustrating a captured image B captured by the first terminal apparatus 20A in the positional relationship illustrated in FIG. 3.

The system 1 according to the present embodiment is a system for providing online events, for example, in which a plurality of users can participate using terminal apparatuses. Online events include web conferencing, videoconferencing, or events in virtual spaces, but these examples are not limiting, and online events may be any event conducted by two-way or one-way communication over a network and involving the transmission and receipt of images.

The system 1 includes the first terminal apparatus 20A configured to repeatedly transmit a captured image that is captured using an imager 22 such as a camera and the second terminal apparatus 20B configured to display the captured image received from the first terminal apparatus 20A. As a result, the captured image A, which is captured by the first terminal apparatus 20A and has a display object X such as a whiteboard as a subject, as illustrated in FIG. 2, is displayed on the second terminal apparatus 20B, as illustrated in FIG. 4. Subsequently, suppose that the user of the first terminal apparatus 20A writes text on the display object X with a marker. At this time, as illustrated in FIG. 3, the user stands between the display object X and the imager 22 of the first terminal apparatus 20A, so that the user's body becomes the blocking object Y. A portion of the display object X is consequently hidden by the blocking object Y in the captured image B, as illustrated in the form of captured image B in FIG. 5.

The first terminal apparatus 20A therefore acquires the position of the display object X capable of displaying information. In a case in which existence of the blocking object Y between the display object X and the imager 22 of the first terminal apparatus 20A as illustrated in FIG. 3 is detected, the first terminal apparatus 20A then determines whether a blocked portion Z, which is a portion where the display object X is at least partially blocked by the blocking object Y, exists within the captured image B. In a case in which it is determined that the blocked portion Z exists within the captured image B, as illustrated in FIG. 5, the first terminal apparatus 20A then processes the captured image B for the blocked portion Z within the captured image B to be identifiable and transmits a captured image in which the blocked portion Z is identifiable as the captured image B. This enables the second terminal apparatus 20B to display the captured image B without displaying the blocked portion Z based on the captured image B received from the first terminal apparatus 20A.

Thus, when the user of the first terminal apparatus 20A captures an image of the display object X, such as a sheet of paper or a whiteboard, and shares the captured image with the user of the second terminal apparatus 20B via the network 30, the display object X may be at least partially blocked by the blocking object Y, such as the user's body. In such a case, according to the present embodiment, the display object X can be displayed on the second terminal apparatus 20B without displaying the blocking object Y. According to the present embodiment, the usefulness of technology for capturing information displayed on a display object, such as paper or a whiteboard, and sharing the information over a network is therefore improved.

The display object X is, for example, a sheet of paper or a whiteboard, but these examples are not limiting. The display object X may be any object capable of displaying information, such as a screen, a display, a touch panel, or a board. The display object X may have a function for displaying information, or it may be capable of displaying information by being written on by a pen or the like. The blocking object Y is, for example, a human hand or head, but these examples are not limiting. The blocking object Y may be any object that can be positioned between the display object X and the first terminal apparatus 20A.

Next, with reference to FIG. 1, each constituent element of the system 1 will be explained in detail.

(Configuration of Server Apparatus)

As illustrated in FIG. 1, the server apparatus 10 includes a communication interface 11, an input interface 12, an output interface 13, a memory 14, and a controller 15.

The communication interface 11 includes at least one communication interface for connecting to the network. The communication interface included in the communication interface 11 is compliant with, for example, a mobile communication standard, a wired LAN standard, or a wireless LAN standard, but is not limited to these, and may be compliant with any communication standard. In the present embodiment, the server apparatus 10 communicates with the terminal apparatus 20 via the communication interface 11 and the network 30. The server apparatus 10 may communicate with computers other than the terminal apparatus 20 according to the present embodiment via the communication interface 11 and the network 30.

The input interface 12 includes at least one interface for input. The interface for input is, for example, a physical key, a capacitive key, a pointing device, a touch screen integrally provided with the display, a microphone, or the like. The input interface 12 accepts operations to input information used for operation of the server apparatus 10 and transmits the inputted information to the controller 15.

The output interface 13 includes at least one interface for output. The interface for output is, for example, a display or a speaker. The display is, for example, a Liquid Crystal Display (LCD) or an organic Electro Luminescent (EL) display. The output interface 13 outputs information such as images, sound, or the like. The input interface 12 and the output interface 13 may be formed integrally as a touch panel, for example.

The memory 14 includes one or more memories. The memories included in the memory 14 may each function as, for example, a main memory, an auxiliary memory, or a cache memory. The memory 14 stores any information used for operations of the server apparatus 10. For example, the memory 14 may store a system program, an application program, a database, and the like. The information stored in the memory 14 may be updated with, for example, information acquired from the network 30 via the communication interface 11.

The controller 15 includes at least one processor, at least one programmable circuit, at least one dedicated circuit, or a combination of these. The processor is, for example, a general purpose processor such as a central processing unit (CPU) or a graphics processing unit (GPU), or a dedicated processor that is dedicated to specific processing, but is not limited to these. The programmable circuit is, for example, a field-programmable gate array (FPGA), but is not limited to this. The dedicated circuit is, for example, an application specific integrated circuit (ASIC), but is not limited to this. The controller 15 controls the operations of the entire server apparatus 10.

(Configuration of Terminal Apparatus)

As illustrated in FIG. 1, the terminal apparatus 20 includes a communication interface 21, an imager 22, an input interface 23, an output interface 24, a memory 25, and a controller 26.

The communication interface 21 includes at least one communication interface for connecting to the network 30. The communication interface included in the communication interface 21 is compliant with mobile communication standards, such as the 4th generation (4G) standard or the 5th generation (5G) standard, for example, but is not limited to these, and may be compliant with any communication standard. In the present embodiment, the terminal apparatus 20 communicates with the server apparatus 10 and other terminal apparatuses 20 via the communication interface 21 and the network 30. The terminal apparatus 20 may communicate with computers other than the server apparatus 10 and other terminal apparatuses 20 according to the present embodiment according to the present embodiment via the communication interface 21 and the network 30.

The imager 22 includes one or more cameras. In the present embodiment, the camera includes an imaging sensor 22A that converts light into electrical signals using an imaging element to generate a captured image of a subject and a depth sensor 22B that measures the distance to the subject to generate a depth image. The imaging sensor 22A includes an RGB camera and captures the subject at, for example, 15 to 30 frames per second to produce a moving image formed by a series of captured images. The depth sensor 22B includes a ToF (Time Of Flight) camera, LiDAR (Light Detection And Ranging), or a stereo camera and generates depth information indicating the distance to the subject appearing in a captured image. The depth information is associated with the captured image and is a depth image, for example. However, the depth information is not limited to depth images and may, for example, be numerical information indicating the distance to the subject appearing in the captured image. In such cases, the depth information may be added as metadata to the captured image. The imager 22 transmits the captured image and the depth information to the controller 26.

The input interface 23 includes at least one interface for input. The interface for input is, for example, a physical key, a capacitive key, a pointing device, a touch screen integrally provided with the display, a microphone, or the like. The input interface 23 accepts operations for inputting information to be used in the operations of the terminal apparatus 20 and transmits the inputted information to the controller 26.

The output interface 24 includes at least one interface for output. The interface for output is, for example, a display or a speaker. The display is, for example, a Liquid Crystal Display (LCD) or an organic Electro Luminescent (EL) display. The output interface 24 outputs information in the form of images, sound, or the like. The input interface 23 and the output interface 24 may be formed integrally as a touch panel, for example.

The memory 25 includes one or more memories. The memories included in the memory 25 may each function as, for example, a main memory, an auxiliary memory, or a cache memory. The memory 25 stores any information to be used for operations of the terminal apparatus 20. For example, the memory 25 may store a system program, an application program, embedded software, or the like. The information stored in the memory 25 may be updated with, for example, information acquired from the network 30 via the communication interface 21.

The controller 26 includes at least one processor, at least one programmable circuit, at least one dedicated circuit, or a combination of these. The processor is a general purpose processor such as a CPU or a GPU, or a dedicated processor that is dedicated to specific processing, for example, but is not limited to these. The programmable circuit is an FPGA, for example, but is not limited to this. The dedicated circuit is an ASIC, for example, but is not limited to this. The controller 26 controls the operations of the entire terminal apparatus 20.

(Flow of Operations of System)

Figure 6:
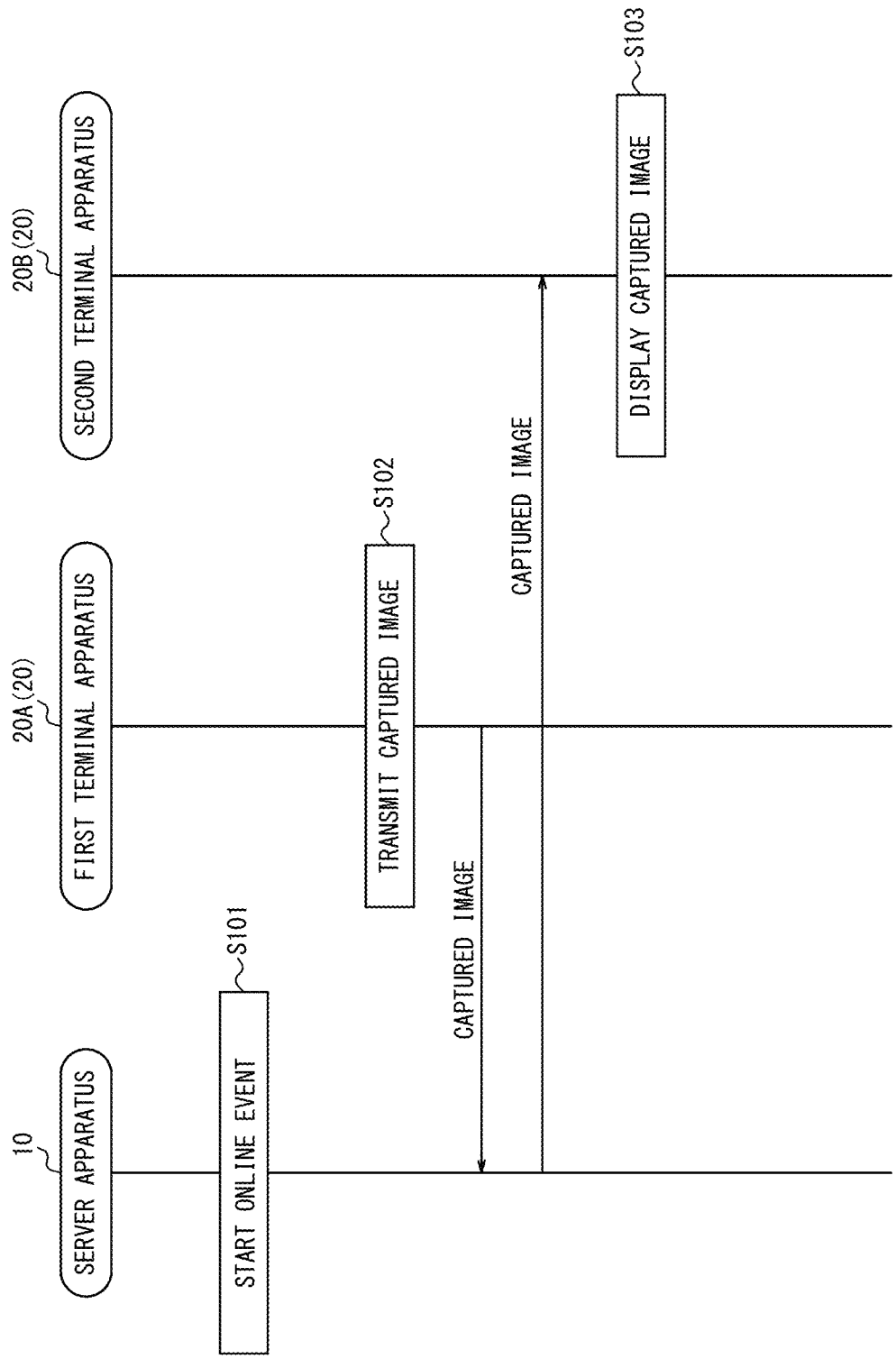
FIG. 6 is a sequence diagram illustrating example operations of the system illustrated in FIG. 1.
Figure 7:
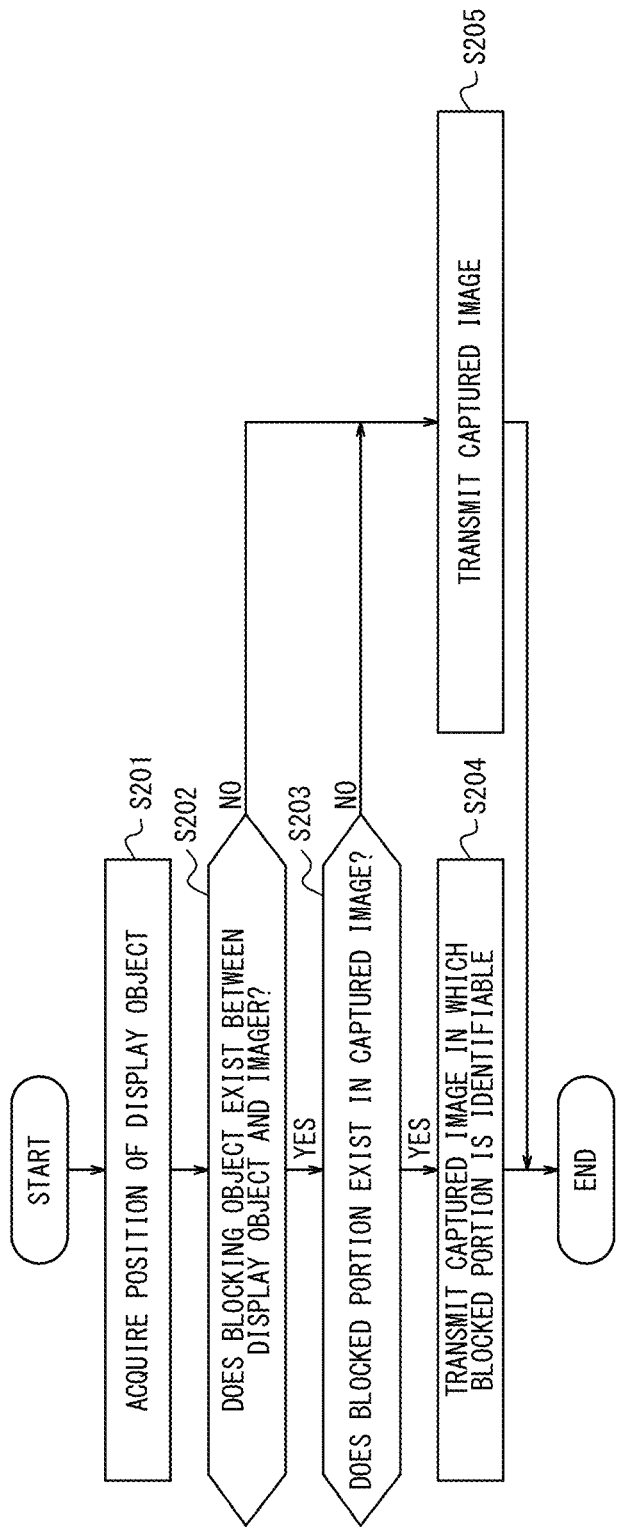
FIG. 7 is a flowchart illustrating example operations when the terminal apparatus illustrated in FIG. 1 transmits a captured image.
Figure 8:
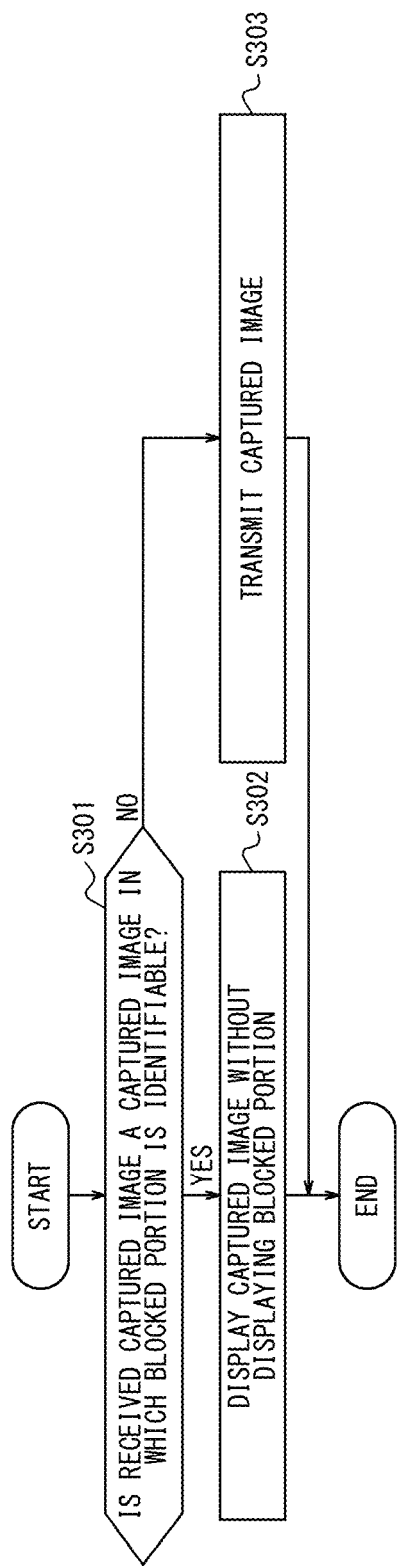
FIG. 8 is a flowchart illustrating example operations when the terminal apparatus illustrated in FIG. 1 displays a received image.

With reference to FIGS. 6, 7, and 8, operations of the system 1 according to the present embodiment will be described. FIG. 6 is a sequence diagram illustrating example operations of the system 1. FIG. 7 is a flowchart illustrating example operations when the first terminal apparatus 20A transmits a captured image. FIG. 8 is a flowchart illustrating example operations when the second terminal apparatus 20B displays a received captured image. These operations correspond to a method performed by the server apparatus 10, the first terminal apparatus 20A, or the second terminal apparatus 20B included in the system 1 according to the present embodiment.

In these example operations, it is assumed that the user of the first terminal apparatus 20A uses the system 1 to capture information displayed on the display object X (for example, text written by the user on a whiteboard) with the imager 22 of the first terminal apparatus 20A and share the information in real time with the user of the second terminal apparatus 20B. In these example operations, the display object X is positioned at a distance d1 from the imager 22 of the first terminal apparatus 20A, as illustrated in FIG. 2.

Referring to FIG. 6, in step S101, the server apparatus 10 initiates an online event in which the first terminal apparatus 20A and the second terminal apparatus 20B participate.

Any method can be adopted to initiate the online event. For example, the controller 15 of the server apparatus 10 initiates an online event in which the terminal apparatus 20A and the terminal apparatus 20B participate, such as a web conference, based on an online event initiation request received from the terminal apparatus 20A or the second terminal apparatus 20B. In conjunction with the start of the online event, the controller 15 may communicate with each of the first terminal apparatus 20A and the second terminal apparatus 20B to authenticate the users by user ID, password, or the like.

In these example operations, it is assumed that the controller 15 of the server apparatus 10 conducts the online event by communicating with each of the first terminal apparatus 20A and the second terminal apparatus 20B after the online event starts, transmitting information received from the first terminal apparatus 20A to the second terminal apparatus 20B, and transmitting information received from the second terminal apparatus 20B to the first terminal apparatus 20A. However, after the online event has started, the first terminal apparatus 20A and the second terminal apparatus 20B may conduct the online event by transmitting information to each other without going through the server apparatus 10.

After the start of the online event, the captured image yielded by capturing an image of the display object X is transmitted by the first terminal apparatus 20A in step S102. Then, in step S103, the captured image received from the first terminal apparatus 20A is displayed by the second terminal apparatus 20B. By repetition of steps S102 and S103, the images captured by the first terminal apparatus 20A are displayed as a moving image on the second terminal apparatus 20B.

The operations by which the first terminal apparatus 20A transmits the captured image in step S102 are described in detail below with reference to FIG. 7.

In step S201, the controller 26 of the first terminal apparatus 20A acquires the position of the display object X capable of displaying information.

Any method can be adopted to acquire the position of the display object X. For example, the controller 26 of the first terminal apparatus 20A may store the distance d1 from the imager 22 to the display object X in advance in the memory 25 as information indicating the position of the display object X. Alternatively, the controller 26 may accept user input, via the input interface 23, specifying the distance d1 from the imager 22 to the display object X. This enables the controller 26 to identify the position of the display object X in real space using the depth sensor 22B of the imager 22.

In step S202, the controller 26 of the first terminal apparatus 20A determines whether a blocking object Y exists between the display object X and the imager 22.

Any appropriate method can be adopted to determine whether the blocking object exists. For example, the controller 26 of the first terminal apparatus 20A may detect the existence of a blocking object Y between the display object X and the imager 22 using the depth sensor 22B of the imager 22. Specifically, the controller 26 controls the imager 22 to generate a captured image and a depth image. The controller 26 can determine that a blocking object Y exists between the display object X and the imager 22 in a case in which there is a region, in the depth image generated by the depth sensor 22B, that indicates a distance that is less than the distance d1 from the imager 22 to the display object X. Conversely, the controller 26 can determine that there is no blocking object Y between the display object X and the imager 22 in a case in which there is no region, in the depth image, indicating a distance less than the distance d1.

For example, as illustrated in FIG. 3, in a case in which the controller 26 of the first terminal apparatus 20A detects the existence of a blocking object Y between the display object X and the imager 22 (step S202: YES), the process advances to step S203. In step S203, the controller 26 determines whether a blocked portion Z, which is a portion where the display object X is at least partially blocked by the blocking object Y, exists in the captured image.

Any method can be adopted to determine whether the blocked portion Z exists in the captured image. For example, the controller 26 of the first terminal apparatus 20A identifies the position of the display object X displayed in the captured image and depth image based on the position of the display object X acquired in step S201. In a case in which there is a region in the depth image indicating a distance less than the distance d1 (for example, d2) among the positions where the display object X should be displayed, the controller 26 may determine that the region is the blocked portion Z. The controller 26 can identify the blocked portion Z in the captured image by mapping the depth image to the captured image.

For example, as illustrated in FIG. 3, assume that the user of the first terminal apparatus 20A stands at a distance d2 (where d2<d1) from the imager 22 of the first terminal apparatus 20A and writes text on the display object X. Consequently, a captured image B as illustrated in FIG. 5 is captured by the first terminal apparatus 20A. In such a case, the controller 26 of the first terminal apparatus 20A detects the user's body, located between the display object X and the imager 22 of the first terminal apparatus 20A, as the blocking object Y using the depth sensor 22B. The controller 26 can, as a result, identify the shaded portion in FIG. 5 as the blocked portion Z in the captured image B.

Referring again to FIG. 7, in a case in which the controller 26 of the first terminal apparatus 20A determines that the blocked portion Z exists in the captured image B (step S203: YES), the process advances to step S204. In step S204, the controller 26 processes the captured image B for the blocked portion Z within the captured image B to be identifiable and transmits a captured image in which the blocked portion Z is identifiable as the captured image B.

In step S204, the controller 26 of the first terminal apparatus 20A may use any method to process the captured image B to be a captured image such that the blocked portion Z within the captured image B is identifiable. For example, the controller 26 may generate a captured image such that the blocked portion Z is identifiable by adding metadata, to the captured image B, indicating the position of the blocked portion Z in the captured image B (for example, coordinate information for the blocked portion Z in the captured image). Alternatively, the controller 26 may generate a captured image in which the blocked portion is identifiable by converting the color of the blocked portion Z in the captured image B to a specific color indicating the blocked portion Z. The controller 26 transmits the generated captured image in which the blocked portion Z is identifiable to the second terminal apparatus 20B as the captured image B. This enables the second terminal apparatus 20B to identify the blocked portion Z in the captured image B and display the captured image B without displaying the blocked portion Z.

For example, in step S204, the controller 26 may generate, as the captured image B in which the blocked portion is identifiable, an image yielded by deleting pixel information, from the captured image B, for the region in which the blocked portion Z is displayed. In other words, the captured image in which the blocked portion is identifiable may be a captured image such that pixel information for the blocked portion Z is deleted from the captured image B. The pixel information includes, for example, positional information for pixels and color information for pixels in the captured image. By the first terminal apparatus 20A thus deleting the pixel information for the blocked portion Z from the captured image B in advance and transmitting the result, the amount of communication data associated with the transmission of the captured image B can be reduced, and the display processing load for displaying the captured image B without displaying the blocked portion Z can be reduced on the second terminal apparatus 20B.

Referring again to FIG. 7, in a case in which the controller 26 of the first terminal apparatus 20A determines no blocking object Y exists between the display object X and the imager 22 (step S202: NO), or that no blocked portion Z exists in the captured image (step S203: NO), the process advances to step S205. In step S205, the controller 26 transmits the captured image that was captured by the imager 22.

When transmitting the captured image, the controller 26 of the first terminal apparatus 20A may transmit depth information, such as a depth image, along with the captured image. This makes it possible to perform more advanced display processing, such as three-dimensional display, on the second terminal apparatus 20B side.

Next, the operations by which the second terminal apparatus 20B displays the captured image, received from the first terminal apparatus 20A, in step S103 of FIG. 6 are described in detail with reference to FIG. 8. For the sake of explanation, it is assumed that the second terminal apparatus 20B has newly received the captured image B illustrated in FIG. 5 while having already received and displayed the captured image A in FIG. 4. In the following explanation, the captured image A is also referred to as the captured image A already being displayed, and the captured image B is also referred to as the new captured image B.

In step S301, the controller 26 of the second terminal apparatus 20B determines whether the captured image B received from the first terminal apparatus 20A is a captured image in which the blocked portion is identifiable.

In step S301, the controller 26 of the second terminal apparatus 20B may use any method to determine whether the received captured image B is a captured image in which the blocked portion Z is identifiable. For example, in a case in which metadata indicating the position of the blocked portion Z in the captured image B has been added to the captured image B, the controller 26 may determine that the captured image B is a captured image such that the blocked portion Z is identifiable. As another example, in a case in which a specific color indicating the blocked portion Z is included in the captured image B, the controller 26 may determine that the captured image B is a captured image such that the blocked portion Z is identifiable. Alternatively, in a case in which a portion of the pixel information has been deleted from the received captured image B, the controller 26 may determine that the captured image B is a captured image such that the blocked portion Z is identifiable.

In a case in which the controller 26 of the second terminal apparatus 20B determines that the captured image B received from the first terminal apparatus 20A is a captured image in which the blocked portion Z is identifiable (step S301: Yes), the process advances to step S302. In step S302, the second terminal apparatus 20B displays the captured image B without displaying the blocked portion Z based on the captured image B received from the first terminal apparatus 20A.

In step S302, the controller 26 of the second terminal apparatus 20B may use any method to display the captured image B without displaying the blocked portion Z. For example, in step S302, when displaying the new captured image B received from the first terminal apparatus 20A, the controller 26 may display the new captured image B without displaying the blocked portion Z, in a case in which it is determined that the blocked portion Z exists in the new captured image B, by supplementing the blocked portion Z in the new captured image B with a portion Z' corresponding to the blocked portion Z in the captured image A that is already being displayed.

Figure 9:
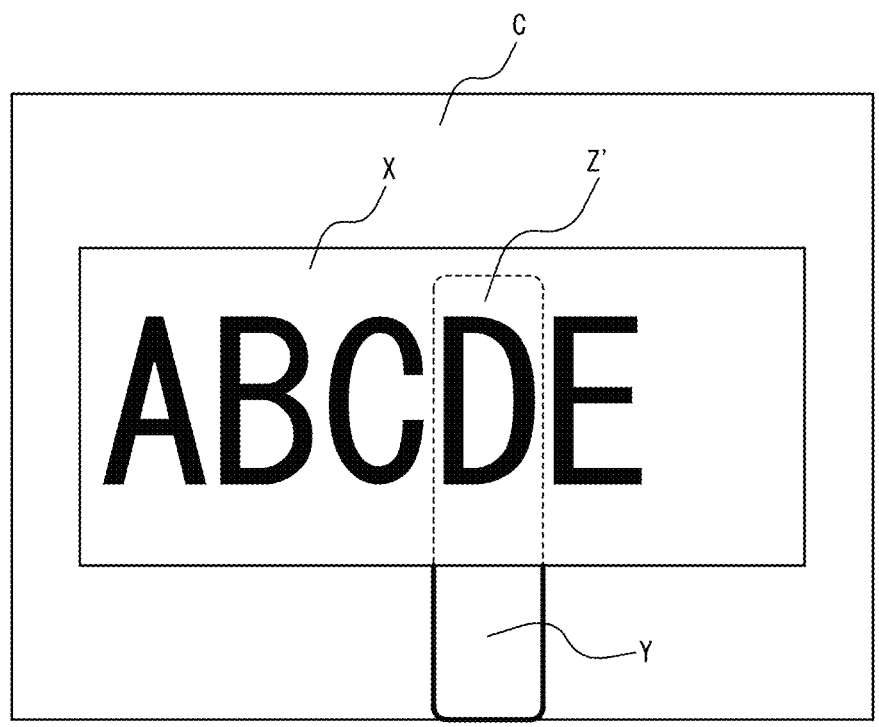
FIG. 9 is a diagram illustrating a captured image displayed on the second terminal apparatus illustrated in FIG. 1.

For example, suppose that the second terminal apparatus 20B receives the new captured image B illustrated in FIG. 5 while displaying the captured image A illustrated in FIG. 4. At this time, the controller 26 of the second terminal apparatus 20B identifies the blocked portion Z in the captured image B, as illustrated by the dashed line in FIG. 5. The controller 26 deletes the pixel information for the blocked portion Z from the new captured image B and then superimposes the new captured image B on the captured image A already being displayed. The controller 26 can thereby generate a captured image C in which the blocked portion Z of the new captured image B is supplemented by the portion Z' corresponding to the blocked portion Z in the captured image A already being displayed, as illustrated in FIG. 9. FIG. 9 is a diagram illustrating the captured image C displayed on the second terminal apparatus 20B. By displaying the captured image C as the new captured image B via the output interface 24 in this way, the controller 26 can display the captured image after supplementing the information on the display object X that is hidden by the blocking object Y.

As another example, in step S302, when displaying the new captured image B received from the first terminal apparatus 20A, the controller 26 of the second display apparatus 20B may, in a case in which it is determined that the blocked portion Z exists in the new captured image B, identify an information display portion, in which information is displayed, from a portion of the display object X in the new captured image B other than the blocked portion Z.

The controller 26 may display the new captured image B without displaying the blocked portion Z by superimposing the information display portion on the display object X in the captured image A that is already being displayed.

For example, suppose that the second terminal apparatus 20B receives the new captured image B illustrated in FIG. 5 while displaying the captured image A illustrated in FIG. 4. At this time, the controller 26 of the second terminal apparatus 20B identifies the blocked portion Z in the captured image B, as illustrated by the dashed line in FIG. 5. The controller 26 identifies "ABC" and "E", which appear in a portion other than the blocked portion Z in the display object X in the new captured image B, as the information display portion. The controller 26 superimposes the identified information display portion "ABC" and "E" on the captured image A already being displayed. This enables the controller 26 to display the captured image C as the new captured image B via the output interface 24, as illustrated in FIG. 9, following the captured image A. In this way, when the new captured image B is displayed, the differences in the display object X are sequentially reflected in the captured image A that is already being displayed, enabling a real time display of the process of information being displayed on the display object X.

Here, any method can be adopted to identify the information display portion in which the information for the display object X is displayed. For example, the controller 26 of the second terminal apparatus 20B may store a first color, which is a base color of the display object X, in the memory 25 in advance. This enables the controller 26 to identify the portion, of the display object X in the new captured image B, displayed in a different color from the first color as the information display portion in step S302.

For example, in a case in which the base color of the display object X, which is a whiteboard, is white, the controller 26 of the second terminal apparatus 20B may identify a non-white portion in the display object X as the information display portion. By a portion that is a different color from the base color of the display object X being identified in this way as information displayed on the display object X, the information displayed on the display object X can be displayed without omission.

Alternatively, the second terminal apparatus 20B may store a second color that is the color of the information display portion in advance, and in step S302, may thereby identify a portion, displayed in the display object X in the new captured image B, that is the second color as the information display portion.

For example, the controller 26 of the second terminal apparatus 20B may identify a portion that is the color of the marker, such as black, red, or blue, as the information display portion. By a portion that is a specific color being identified in this way as information displayed on the display object X, information other than the information displayed on the display object X, i.e., noise, is less likely to be displayed.

However, in a case in which the information display portion of the display object X is identified, the shadow of the blocking object Y may appear on the surface of the display object X. Due to being located at the same depth as the display object X, the shadow portion is not determined to be a portion of the blocking object Y despite use of the depth sensor 22B. Therefore, the shadow of the blocking object Y on the surface of the display object X may end up being identified as a portion of the information display portion in the above-described processing.

For such a case, in the above-described processing, the controller 26 of the second terminal apparatus 20B may further identify the information display portion in the captured image A already being displayed. The controller 26 may, in a case in which at least a portion of the information display portion in the captured image A that is already being displayed is not identified as either the blocked portion Z or the information display portion in the new captured image B, display information in the new captured image B instead of the at least a portion of the information display portion in the captured image A that is already being displayed. In a case in which the shadow of the blocking object Y temporarily appears on the surface of the display object X and is mistakenly recognized as the information display portion, this prevents the shadow from continuing to be displayed in the captured image as part of the information display portion after the shadow disappears from the surface of the display object X.

As described above, the system 1 according to the present embodiment includes the first terminal apparatus 20A configured to repeatedly transmit a captured image that is captured using the imager 22 and the second terminal apparatus 20B configured to display the captured image received from the first terminal apparatus 20A. The first terminal apparatus 20A acquires the position of the display object X capable of displaying information, and in a case in which existence of the blocking object Y between the display object X and the imager 22 is detected, the first terminal apparatus 20A determines whether the blocked portion Z, which is a portion where the display object X is at least partially blocked by the blocking object Y, exists within the captured image. In a case in which it is determined that the blocked portion Z exists within the captured image, the first terminal apparatus 20A processes the captured image for the blocked portion Z within the captured image to be identifiable. The first terminal apparatus 20A then transmits a captured image in which the blocked portion Z is identifiable as the captured image. The second terminal apparatus 20B displays the captured image without displaying the blocked portion Z based on the captured image received from the first terminal apparatus 20A.

When the user of the first terminal apparatus 20A captures an image of the display object X, such as a sheet of paper or a whiteboard, the display object X may be at least partially blocked by the blocking object Y, such as the user's body. Even in this case, however, according to the above configuration, the second terminal apparatus 20B can still display the captured image received from the first terminal apparatus 20A without displaying the blocking object Y. According to the present embodiment, the usefulness of technology for capturing information displayed on a display object, such as paper or a whiteboard, and sharing the information over a network is therefore improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which a general purpose computer functions as the server apparatus 10, the first terminal apparatus 20A, or the second terminal apparatus 20B according to the above embodiment can also be implemented. Specifically, a program in which processes for realizing the functions of the server apparatus 10, the first terminal apparatus 20A, or the second terminal apparatus 20B according to the above embodiment are written may be stored in a memory of a general purpose computer, and the program may be read and executed by a processor. Accordingly, the present disclosure can also be implemented as a program executable by a processor, or a non-transitory computer readable medium storing the program.

For example, in the above embodiment, the first terminal apparatus 20A or the second terminal apparatus 20B may be configured to execute some or all of the operations and processing executed by the server apparatus 10. Similarly, the server apparatus 10 may be configured to execute some of the operations and processing executed by the first terminal apparatus 20A or the second terminal apparatus 20B. For example, the server apparatus 10 may receive the captured images and depth images captured by the first terminal apparatus 20A from the first terminal apparatus 20A, execute each of the processes described as processes of the first terminal apparatus 20A and the second terminal apparatus 20B, generate the captured images to be displayed on the second terminal apparatus 20B, and transmit the captured images to the second terminal apparatus 20B. This can reduce the processing load on the terminal apparatus 20 side and enables use of a less expensive computer as the terminal apparatus 20.

Alternatively, the first terminal apparatus 20A may be configured to execute some of the operations and processing executed by the second terminal apparatus 20B. After capturing the captured images and depth images, the first terminal apparatus 20A may execute each of the processes described as processes of the second terminal apparatus 20B, generate the captured images to be displayed on the second terminal apparatus 20B, and transmit the captured images to the second terminal apparatus 20B. This can reduce the processing load on the second terminal apparatus 20B side and enables use of a less expensive computer as the second terminal apparatus 20B.

Examples of some embodiments of the present disclosure are described below. However, it should be noted that the embodiments of the present disclosure are not limited to these examples.

[Appendix 1] A system comprising:
a first terminal apparatus configured to repeatedly transmit a captured image that is captured using an imager; and
a second terminal apparatus configured to display the captured image received from the first terminal apparatus, wherein
the first terminal apparatus is configured to
acquire a position of a display object capable of displaying information,
determine, in a case in which existence of a blocking object between the display object and the imager is detected, whether a blocked portion, which is a portion where the display object is at least partially blocked by the blocking object, exists within the captured image, and
process, in a case in which it is determined that the blocked portion exists within the captured image, the captured image for the blocked portion within the captured image to be identifiable and transmit a captured image in which the blocked portion is identifiable as the captured image, and the second terminal apparatus is configured to display the captured image without displaying the blocked portion based on the captured image received from the first terminal apparatus.

[Appendix 2] The system according to appendix 1, wherein
the imager comprises a depth sensor, and
the first terminal apparatus is configured to detect the existence of the blocking object between the display object and the imager using the depth sensor.

[Appendix 3] The system according to appendix 1 or 2, wherein the captured image in which the blocked portion is identifiable is a captured image in which pixel information for the blocked portion is deleted from the captured image.

[Appendix 4] The system according to any one of appendices 1 to 3, wherein when displaying a new captured image received from the first terminal apparatus, the second terminal apparatus is configured to display the new captured image without displaying the blocked portion, in a case in which it is determined that the blocked portion exists in the new captured image, by supplementing the blocked portion in the new captured image with a portion corresponding to the blocked portion in a captured image that is already being displayed.

[Appendix 5] The system according to any one of appendices 1 to 3, wherein when displaying a new captured image received from the first terminal apparatus, the second terminal apparatus is configured to display the new captured image without displaying the blocked portion, in a case in which it is determined that the blocked portion exists in the new captured image, by identifying an information display portion, in which information is displayed, from a portion of the display object in the new captured image other than the blocked portion, and superimposing the information display portion on the display object in a captured image that is already being displayed.

[Appendix 6] The system according to appendix 5, wherein the second terminal apparatus is configured to store in advance a first color that is a base color of the display object and identify a portion, displayed in the display object in the new captured image, that is a different color from the first color as the information display portion.

[Appendix 7] The system according to appendix 5, wherein the second terminal apparatus is configured to store in advance a second color that is a color of the information display portion and identify a portion, displayed in the display object in the new captured image, that is the second color as the information display portion.

[Appendix 8] The system according to any one of appendices 5 to 7, wherein the second terminal apparatus is further configured to identify an information display portion in the captured image that is already being displayed, and in a case in which at least a portion of the information display portion in the captured image that is already being displayed is not identified as either the blocked portion or the information display portion in the new captured image, display information in the new captured image instead of the at least a portion of the information display portion in the captured image that is already being displayed.

[Appendix 9] A terminal apparatus comprising an imager, a communication interface, and a controller and configured to repeatedly transmit a captured image that is captured using the imager, wherein
the controller is configured to
acquire a position of a display object capable of displaying information,
determine, in a case in which existence of a blocking object between the display object and the imager is detected, whether a blocked portion, which is a portion where the display object is at least partially blocked by the blocking object, exists within the captured image, and process, in a case in which it is determined that the blocked portion exists within the captured image, the captured image for the blocked portion within the captured image to be identifiable and transmit a captured image in which the blocked portion is identifiable as the captured image.

[Appendix 10] The terminal apparatus according to appendix 9, wherein the imager comprises a depth sensor, and the controller is configured to detect the existence of the blocking object between the display object and the imager using the depth sensor.

[Appendix 11] The terminal apparatus according to appendix 9 or 10, wherein the captured image in which the blocked portion is identifiable is a captured image in which pixel information for the blocked portion is deleted from the captured image.

[Appendix 12] A terminal apparatus comprising an output interface, a communication interface, and a controller and configured to display a captured image received from another terminal apparatus, wherein in a case in which the captured image received from the another terminal apparatus is a captured image in which a blocked portion existing within the captured image is identifiable, the controller is configured to display the captured image without displaying the blocked portion, and the blocked portion is a portion in the captured image where a display object configured to display information is at least partially blocked by a blocking object.

[Appendix 13] The terminal apparatus according to appendix 12, wherein the captured image in which the blocked portion is identifiable is a captured image in which pixel information for the blocked portion is deleted from the captured image.

[Appendix 14] The terminal apparatus according to appendix 12 or 13, wherein when displaying a new captured image received from the another terminal apparatus, the controller is configured to display the new captured image without displaying the blocked portion, in a case in which it is determined that the blocked portion exists in the new captured image, by supplementing the blocked portion in the new captured image with a portion corresponding to the blocked portion in a captured image that is already being displayed.

[Appendix 15] The terminal apparatus according to appendix 12 or 13, wherein when displaying a new captured image received from the another terminal apparatus, the controller is configured to display the new captured image without displaying the blocked portion, in a case in which it is determined that the blocked portion exists in the new captured image, by identifying an information display portion, in which information is displayed, from a portion of the display object in the new captured image other than the blocked portion, and superimposing the information display portion on the display object in a captured image that is already being displayed.

[Appendix 16] The terminal apparatus according to appendix 15, wherein the controller is configured to store in advance a first color that is a base color of the display object and identify a portion, displayed in the display object in the new captured image, that is a different color from the first color as the information display portion.

[Appendix 17] The terminal apparatus according to appendix 15, wherein the controller is configured to store in advance a second color that is a color of the information display portion and identify a portion, displayed in the display object in the new captured image, that is the second color as the information display portion.

[Appendix 18] The terminal apparatus according to any one of appendices 15 to 17, wherein the controller is further configured to identify an information display portion in the captured image that is already being displayed, and in a case in which at least a portion of the information display portion in the captured image that is already being displayed is not identified as either the blocked portion or the at least a portion of the information display portion in the new captured image, display information in the new captured image instead of the at least a portion of the information display portion in the captured image that is already being displayed.

The invention claimed is:

1. A system comprising:

a first terminal apparatus configured to repeatedly transmit a captured image that is captured using an imager; and a second terminal apparatus configured to display the captured image received from the first terminal apparatus, wherein the first terminal apparatus is configured to:

acquire a position of a display object capable of displaying information, determine, in response to detecting an existence of a blocking object between the display object and the imager, whether a blocked portion, which is a portion where the display object is at least partially blocked by the blocking object, exists within the captured image, process and render, in response to determining that the blocked portion exists within the captured image, the blocked portion within the captured image to be identifiable using at least one of introducing metadata into the captured image or changing a color of the blocked portion in the captured image, wherein the identifiable blocked portion maintains occlusion of an entirety of the portion of the display object, and transmit the captured image including the identifiable blocked portion, wherein the identifiable blocked portion is maintained visible in the transmitted captured image, and the second terminal apparatus is configured to:

receive the captured image including the identifiable blocked portion, process the received captured image to generate an image for display that blocks the blocked portion, and display the image.

2. The system according to claim 1, wherein the imager comprises a depth sensor, and the first terminal apparatus is configured to detect the existence of the blocking object between the display object and the imager using the depth sensor.

3. The system according to claim 1, wherein the captured image in which the blocked portion is identifiable is a captured image in which pixel information for the blocked portion is deleted from the captured image.

4. The system according to claim 1, wherein when displaying a new captured image received from the first terminal apparatus, the second terminal apparatus is configured to display the new captured image without displaying the blocked portion, in response to determining that the blocked portion exists in the new captured image, by supplementing the blocked portion in the new captured image with a portion corresponding to the blocked portion in a captured image that is already being displayed.

5. The system according to claim 1, wherein when displaying a new captured image received from the first terminal apparatus, the second terminal apparatus is configured to display the new captured image without displaying the blocked portion, in response to determining that the blocked portion exists in the new captured image, by identifying an information display portion, in which information is displayed, from a portion of the display object in the new captured image other than the blocked portion, and superimposing the information display portion on the display object in a captured image that is already being displayed.

6. The system according to claim 5, wherein the second terminal apparatus is configured to store in advance a first color that is a base color of the display object and identify a portion, displayed in the display object in the new captured image, that is a different color from the first color as the information display portion.

7. The system according to claim 5, wherein the second terminal apparatus is configured to store in advance a second color that is a color of the information display portion and identify a portion, displayed in the display object in the new captured image, that is the second color as the information display portion.

8. The system according to claim 5, wherein the second terminal apparatus is further configured to identify an information display portion in the captured image that is already being displayed, and in response to at least a portion of the information display portion in the captured image that is already being displayed is not identified as either the blocked portion or the information display portion in the new captured image, display information in the new captured image instead of the at least a portion of the information display portion in the captured image that is already being displayed.

9. The system according to claim 1, further comprising a server, wherein the first terminal apparatus is configured to transmit the captured image including the identifiable blocked portion to the server, and the server is configured to transmit the captured image including the identifiable blocked portion to the second terminal apparatus.

10. A terminal apparatus comprising an imager, a communication interface, and a controller and configured to repeatedly transmit a captured image that is captured using the imager, wherein
the controller is configured to:
acquire a position of a display object capable of displaying information,
determine, in response to detecting an existence of a blocking object between the display object and the imager, whether a blocked portion, which is a portion where the display object is at least partially blocked by the blocking object, exists within the captured image,
process and render, in response to determining that the blocked portion exists within the captured image, the blocked portion within the captured image to be identifiable using at least one of introducing metadata into the captured image or changing a color of the blocked portion in the captured image, wherein the identifiable blocked portion maintains occlusion of an entirety of the portion of the display object, and
transmit the captured image including the identifiable blocked portion to another terminal apparatus,
wherein the identifiable blocked portion is maintained visible in the transmitted captured image,
the another terminal apparatus is configured to:
receive the captured image including the identifiable blocked portion,
process the received captured image to generate an image for display that blocks the blocked portion, and
display the image.

11. The terminal apparatus according to claim 10, wherein the imager comprises a depth sensor, and
the controller is configured to detect the existence of the blocking object between the display object and the imager using the depth sensor.

12. The terminal apparatus according to claim 10, wherein the captured image in which the blocked portion is identifiable is a captured image in which pixel information for the blocked portion is deleted from the captured image.

13. A terminal apparatus comprising an output interface, a communication interface, and a controller and configured to display a captured image received from another terminal apparatus, wherein
in response to the captured image received from the another terminal apparatus being a captured image in which an identifiable blocked portion exists, the controller is configured to:
receive the captured image including the identifiable blocked portion,
process the received captured image to generate an image for display that blocks the blocked portion,
display the image, and
the identifiable blocked portion, as received, maintains occlusion of an entirety of a portion of a display object from the captured image, and
wherein the another terminal apparatus is configured to:
determine, in response to detecting an existence of a blocking object between the display object and an imager, whether a blocked portion, which is a portion where the display object is at least partially blocked by the blocking object, exists within the captured image,
process and render, in response to determining that the blocked portion exists within the captured image, the blocked portion within the captured image to be identifiable using at least one of introducing metadata into the captured image or changing a color of the blocked portion in the captured image,
transmit the captured image including the identifiable blocked portion to the terminal apparatus.

14. The terminal apparatus according to claim 13, wherein the captured image including the identifiable blocked portion includes a captured image in which pixel information for the identifiable blocked portion is deleted from the captured image.

15. The terminal apparatus according to claim 13, wherein when displaying a new captured image received from the another terminal apparatus, the controller is configured to display the new captured image without displaying the identifiable blocked portion, in response to a determination that the identifiable blocked portion exists in the new captured image, by supplementing the identifiable blocked portion in the new captured image with a portion corresponding to the identifiable blocked portion in a captured image that is already being displayed.

16. The terminal apparatus according to claim 13, wherein when displaying a new captured image received from the another terminal apparatus, the controller is configured to display the new captured image without displaying the identifiable blocked portion, in response to determining that the identifiable blocked portion exists in the new captured image, by identifying an information display portion, in which information is displayed, from a portion of the display object in the new captured image other than the identifiable blocked portion, and superimposing the information display portion on the display object in a captured image that is already being displayed.

17. The terminal apparatus according to claim 16, wherein the controller is configured to store in advance a first color that is a base color of the display object and identify a portion, displayed in the display object in the new captured image, that is a different color from the first color as the information display portion.

18. The terminal apparatus according to claim 16, wherein the controller is configured to store in advance a second color that is a color of the information display portion and identify a portion, displayed in the display object in the new captured image, that is the second color as the information display portion.

19. The terminal apparatus according to claim 16, wherein the controller is further configured to identify an information display portion in the captured image that is already being displayed, and in response to at least a portion of the information display portion in the captured image that is already being displayed is not identified as either the identifiable blocked portion or the at least a portion of the information display portion in the new captured image, display information in the new captured image instead of the at least a portion of the information display portion in the captured image that is already being displayed.

* * * * *